May 27, 1958   J. K. MOSHER   2,836,474
SEALING STRUCTURE FOR RECIPROCATING ELEMENTS
Filed March 19, 1956

INVENTOR.
JAMES K. MOSHER
BY
ATTORNEY

2,836,474

SEALING STRUCTURE FOR RECIPROCATING ELEMENTS

James K. Mosher, Pasadena, Calif., assignor to Schulz Tool and Manufacturing Co., Gabriel, Calif., a corporation of California Application March 19, 1956, Serial No. 572,249

4 Claims. (Cl. 309—33)

The present invention relates generally to a sealing structure and relates more specifically to a cup type seal adapted for use in connection with telescoping cylindrical elements.

Heretofore, serious difficulty has been encountered with seals and sealing structures utilized intermediate telescoping or reciprocating elements due, in part, to the normal wear encountered with such sealing structures and to the inability of specific sealing members to stay in contact with cylindrical walls or the like against which they are designed to seal. In the usual prior situations, where flexible sealing members were utilized, initial tension was established on a sealing member in order to maintain initial sealing contact between reciprocating elements. As normal wear of the sealing member took place, this initial tension became inadequate to maintain a tight contact between such reciprocating elements. The obvious result of such a situation includes undesirable leaking about the sealing member, a loose running fit between reciprocating elements, and frequently considerable noise in connection with the operation thereof.

Additionally, it has become increasingly necessary to provide sealing arrangements for use in situations requiring operation over a considerable length of time and wherein service requiring dismantling of the seal would not be necessary during such time. The provision of such long lasting and efficient sealing provides structure that may be used in military applications wherein frequent service is not always available, the very nature thereof obviously reducing the cost of such service.

It is, therefore, one important object of the present invention to provide a sealing structure having features of novelty to overcome the beforementioned inadequacies and difficulties experienced in connection with like prior arrangements.

It is another object of the present invention to provide a sealing structure for use in connection with reciprocating elements wherein an initial force is applied to maintain a sealing member in contact with a surface and to retain this force in use over long periods and during the course of wear of a sealing member utilized therein.

It is a further object of the present invention to provide a novel sealing structure for use intermediate piston and similar walls wherein a sealing member is deformed radially outwardly in such a manner as to maintain a constant force tending to move the sealing member radially outwardly over long periods of use and wear.

It is another object of the present invention to provide a support for a sealing member wherein said support is constructed in such a manner as to provide a constant sealing force behind said sealing member and wherein means are provided for permitting compressive growth of said sealing member.

It will be seen that the present invention has other objects, advantages and features, some of which, with the foregoing, to be set forth in the following description in which a certain embodiment of the invention has been selected for illustrative purposes only in the drawing, accompanying and forming a part of the present specification, and wherein.

Figure 1:
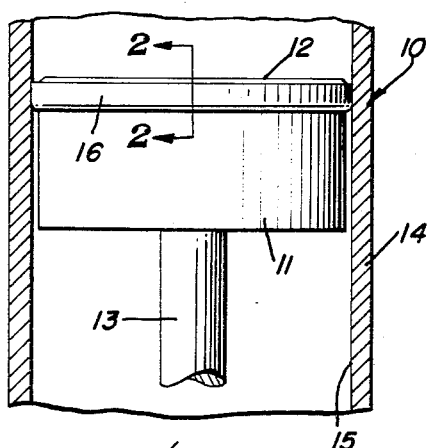
Fig. 1 is a transverse sectional view showing a piston and cylinder with the sealing structure of the present invention mounted thereon.

With reference to the drawing, the sealing structure of the present invention is indicated generally at 10 and is shown in conjunction with a suitable support 11 and the retainer 12, which may form parts of a piston which may in turn be attached to an operating shaft or the like indicated generally at 13. The sealing structure, together with the support and retainer, may be reciprocally positioned within a cylinder 14 having an inner cylindrical surface 15 against which a sealing member 16 is adapted to be slidably operable. While the sealing structure of the present invention has been shown and will be described in connection with one type of piston and one form of cylinder, it is to be understood that the illustrations and descriptions are merely by way of example and that the sealing structure may be applied to various other telescoping or reciprocating elements to provide a movable seal therebetween without departing materially from the spirit of the invention.

Figure 2:
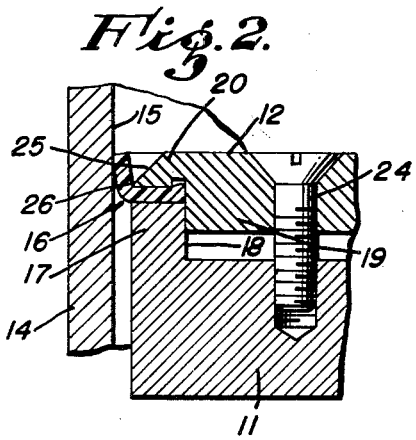
Fig. 2 is an enlarged fragmentary sectional view taken substantially as indicated by line 2—2, Fig. 1.

With reference primarily to Fig. 2, the support 11 is provided with an axially extending peripheral flange 17 that defines a centrally disposed recess 18 in which a boss like portion 19 of the retainer 12 is adapted to be positioned. The retainer 12 further includes a radially extending flange 20 that extends radially outwardly from the boss portion 19 and axially overlies the support flange 17. An annular radially extending groove is thus defined intermediate the axial end of the support flange 17 and the retainer flange 20, this annular groove being adapted for reception of the sealing member 16.

Figure 3:
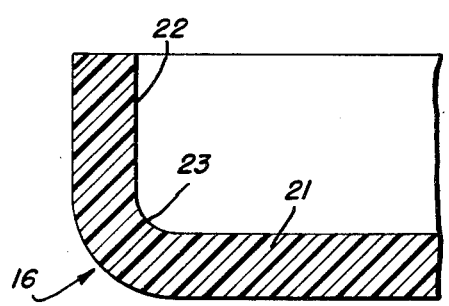
Fig. 3 is a greatly enlarged sectional view showing a portion of the sealing member prior to assembly with the piston or retainer.

As shown primarily in Fig. 3, the sealing member 16 is formed initially with a radially extending portion 21 and an axially extending portion 22, these portions being disposed about a suitable radius 23 and normal to each other. The sealing member 16 may be made from any suitable flexible material having a relatively low coefficient of friction. A material of this type is commonly known as "Teflon"; however, other materials with like properties may be utilized herein without departing from the spirit of the invention.

The radially extending portion 21 of the sealing member 16 is adapted to be disposed in the groove formed between the support and retainer flanges and to be retained therein by means of suitable screws 24 or the like, which extend through the retainer 12 and threadably engage in the support 11. As shown primarily in Figs. 2 and 4, the outer periphery of the retainer flange 20 is beveled as at 25 to thus present a sharp peripheral edge 26 that is adapted to be disposed along the junction of the radial and axial portions 21 and 22 of the sealing member 16, thus to deform the sealing member about a considerably smaller radius and move the axially extending portion 22 radially outwardly into contact with the inner wall 15 of the cylinder 14 radially outwardly to the position indicated by the solid lines and, upon insertion in the cylinder 14 is moved slightly radially inwardly to the position indicated by the dotted lines, thereby placing the outer portion of the annular bend about the radius 23 in considerable tension due to the action of the sharp peripheral edge 26 in reducing the effective inner radius between the portions 21 and 22 of the sealing member 16.

In order to insure maintenance of the portion 22 of the sealing member 16 in contact with the interior surface 15 of the cylinder 14, it is necessary that considerable force be applied intermediate the support flange 17 and retainer flange 20, thus tending to compress the material contained within the radially extending portion 21 of the sealing member 16. In order to compensate for such compression and to permit compressive growth of the portion 21, an axially extending annular groove 27 is provided in the retainer flange 20 adjacent the junction of this flange with the body portion of the retainer 12. This annular groove 27 permits compressive growth or expansion of the portion 21 into the space provided by the groove support 11 or the retainer 12.

Figure 4:
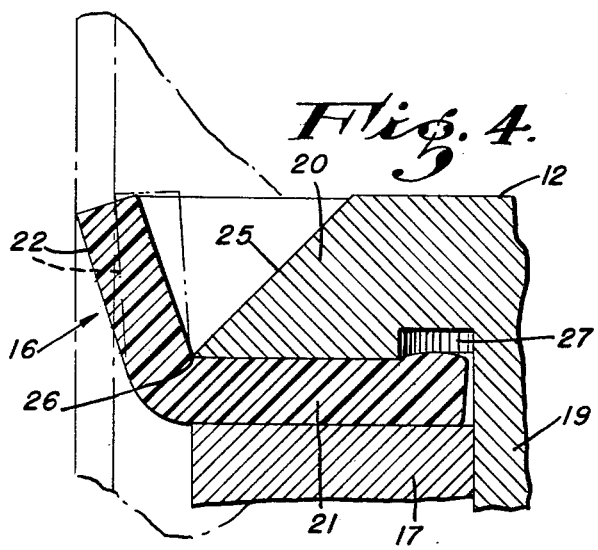
Fig. 4 is an enlarged fragmentary sectional view showing the sealing structure of Fig. 3 assembled with a piston and retainer.

As wear occurs on the radially outer surface of the axially extending portion 22 of the sealing member 16, the constant tension being applied thereto by the aforesaid action of the sharp peripheral edge 26 tends to move the portion 22 from the dotted line position in Fig. 4 toward the solid line position in Fig. 4, thus to maintain the portion 22 in tight contact with the inner wall 15 of the cylinder 14.

From the foregoing description, the uses, advantages and operation of the present invention will be readily understood by those skilled in the art to which the invention appertains. While there has been described a certain embodiment of the invention, it is again desired to emphasize the fact that the invention may be applied to various types of sealing mechanisms and piston arrangements; to have it understood that the example given is merely illustrative and that the invention is not to be limited to the details disclosed herein, but is to be accorded the full scope of the appended claims.

I claim:

1. A sealing structure for use intermediate a piston and a cylinder wall comprising, in combination: an annular support forming part of said piston; an axially extending peripheral flange formed on said support and defining a recess in said support, said flange having a diameter to form an annular space between the flange and the cylinder wall; an annular flexible sealing member having a radially extending portion engaging with an axial end of said flange and an axially extending portion, the junction between said portions being about a radius, said axially extending portion being disposed radially outwardly from said flange; an annular retainer adapted for reception in said recess; means for securing said retainer in position; and a radially extending annular flange on said retainer, said flange being bevelled and having a sharp outer periphery in axial alignment with the periphery of said support flange, spaced axially from said axial surface of said support flange and adapted for engagement with said radially extending portion of said sealing member, said sharp periphery being adapted for engagement with said junction of portions of said sealing member, thereby to deform said sealing member about a reduced radius and force said axially extending portion radially outwardly into tight engagement with said cylinder wall, the thickness of said sealing member being less than the radial dimension of said annular space and said sealing member presenting a rounded configuration at said junction.

2. A sealing structure for use intermediate a piston and a cylinder wall comprising, in combination: an annular support forming part of said piston; an axially extending peripheral flange formed on said support and defining a recess in said support, said flange having a diameter to form an annular space between the flange and the cylinder wall; an annular retainer adapted for reception in said recess; means for securing said retainer in position; an annular flexible sealing member having a radially extending portion engaging with an axial end of said flange and extending into said annular space around the flange and the said retainer, and an axially extending portion, the junction between said portions being about a radius, said axially extending portion being disposed radially outwardly from said flange; a radially extending annular flange formed on said retainer, said annular flange being beveled and having a sharp outer periphery in axial alignment with the periphery of said support flange spaced axially from said axial surface of said support flange and engaging with said radially extending portion of said sealing member, said sharp periphery being adapted for engagement with said junction of portions of said sealing member, thereby to deform said sealing member about a reduced diameter and force said axially extending portion radially outwardly in tight engagement with said cylinder wall, the thickness of said sealing member being less than the radial dimension of said annular space and said sealing member presenting a rounded configuration at said junction; and a groove formed in said retainer and extending axially adjacent the radial inner end of said retainer flange, said groove providing an unoccupied space adapted for permitting compressive growth of said radially extending portion of said sealing member.

3. In a sealing structure, a circular support, a circular retainer; means for securing said retainer to said support; a sealing member disposed between said support and said retainer; circular means spaced annularly from said support and retainer, said retainer having substantially the same diameter as said circular support, said sealing member having radial portions and substantially axially extending portions extending into the annular space around the said retainer, the junction of the radial and axially extending portions having a curved contour, said sealing member having a thickness less than the width of the said annular space between the retainer and circular means, said retainer having a bevel forming a sharp peripheral edge on the said retainer, said peripheral edge being adapted to engage said sealing member along the junction of said radial and axial portions, whereby to deform said axial portion of said sealing member, radially, outwardly into engagement with said circular means; and said sealing member having freedom to deform radially and axially into the said annular space around the retainer.

4. Sealing structure for use intermediate a piston and a cylinder wall comprising in combination: an annular support forming part of said piston, said support having a diameter to form an annular space between the support and the cylinder wall; an annular retainer secured to said support, said retainer having substantially the same diameter as the support; a radially extending annular groove defined between peripheral portions of said support and said retainer; a flexible sealing member having a radially extending portion disposed and secured in said annular groove; an axially extending portion formed on said sealing member, said axially extending portion normally overlying the periphery of said retainer, said sealing member having a thickness less than the width of the said annular space, said retainer having a bevel forming a sharp peripheral edge thereon adjacent to the juction of said axially and radially extending portions of said sealing member, said junction normally having a rounded conformation whereby said sharp edge is adapted to deform said axially extending portion radially outwardly for tight engagement with said cylinder wall; and said sealing member having freedom to expand radially and axially into the said annular space.

References Cited in the file of this patent

UNITED STATES PATENTS

| 289,776 | Luton | Dec. 4, 1883 |
| 1,153,604 | Chapsal | Sept. 14, 1915 |
| 1,672,805 | Conrader | June 5, 1928 |
| 1,818,187 | Bailey | Aug. 11, 1931 |
| 1,945,524 | Foehr | Feb. 6, 1934 |